UNITED STATES PATENT OFFICE.

FRITZ LINDE, OF DORTMUND, GERMANY, ASSIGNOR TO THE KATHREINER'S MALZKAFFEE-FABRIKEN, GESELLSCHAFT MIT BESCHRÄNKTER HAFTUNG, OF MUNICH, GERMANY.

PROCESS OF ROASTING MALT WITH COFFEE.

SPECIFICATION forming part of Letters Patent No. 645,535, dated March 13, 1900.

Application filed December 18, 1899. Serial No. 740,787. (No specimens.)

*To all whom it may concern:*

Be it known that I, FRITZ LINDE, a citizen of Germany, residing at Dortmund, Empire of Germany, have invented a certain new and useful Improvement in the Process of Roasting Malt with Coffee; and I do hereby declare the following to be a full, clear, and exact description of the invention, such as will enable others skilled in the art to which it appertains to make and use the same.

The present invention refers to a process for roasting green malt together with coffee, whereby the green malt is submitted to the aromatic vapor of the coffee and by that loses its disagreeable burned taste. For this purpose the green malt is macerated in water till it has soaked up sixty to sixty-three per cent. of fluid. If there is more or less water in the green malt, then the coffee is more roasted than the malt and the product becomes sticky and useless. The right percentage of water is therefore of the greatest importance. The saccharification of the green malt takes place in the roasting-drum in the first stage of the roasting process.

By the direct roasting of green malt together with coffee the former completely absorbs the aroma of the coffee and loses completely its burned and disagreeable taste.

Having now described my invention, I claim the following:

The process which consists in macerating green malt in water until it has absorbed from sixty to sixty-three per cent. of water and then roasting the same together with coffee, whereby the saccharification of the green malt takes place in the first stage of the roasting and at the same time the malt receives the aromatic vapor from the coffee and loses its disagreeable burned taste.

In testimony whereof I affix my signature in presence of two witnesses.

FRITZ LINDE.

Witnesses:
 J. A. RITTERSHAUS,
 OTTO KÖNIG.